United States Patent Office 3,435,955
Patented Apr. 1, 1969

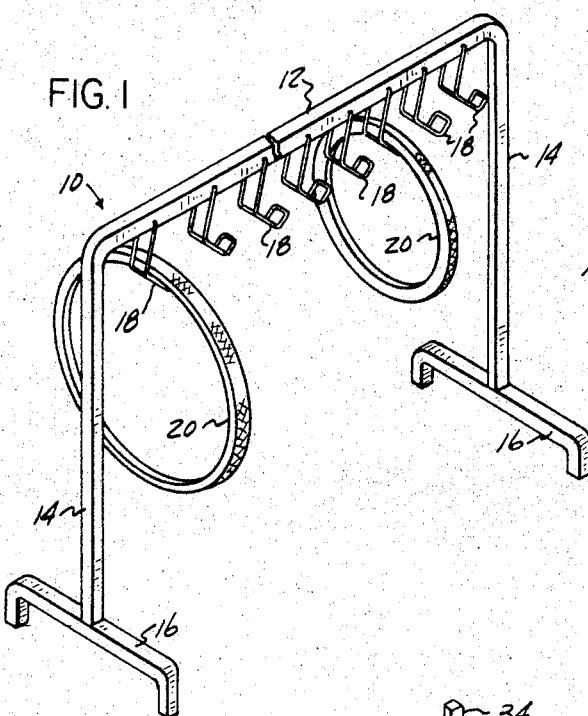
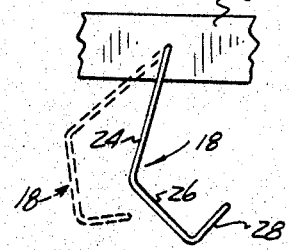
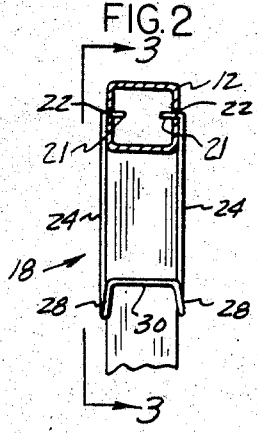
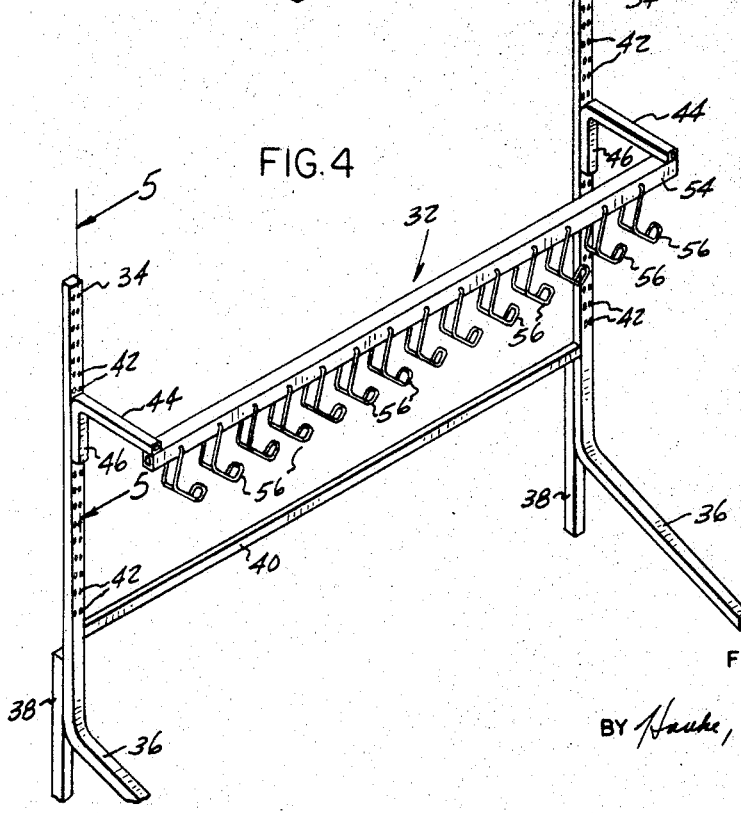

3,435,955
BICYCLE TIRE DISPLAY RACKS
Fredrick F. Brunette, 328 N. Main St.,
Plymouth, Mich. 48170
Filed May 15, 1967, Ser. No. 638,348
Int. Cl. A47f 7/04; B42f 13/00
U.S. Cl. 211—24   11 Claims

ABSTRACT OF THE DISCLOSURE

A rack for individually displaying and supporting a number of bicycle tires in a suspended position. One embodiment discloses a self-supporting frame having a horizontal support member. A series of hook-shaped wire tire supporting elements each having their upper ends swingably connected to the horizontal support member provide means for individually suspending the tires. The tire supporting elements are arranged to swing toward and away from its neighboring elements to permit a tire to be hung or removed without disturbing the remaining tires.

A second embodiment discloses a rack, similar to the first embodiment, but with arms arranged to support the horizontal support member at a selected height above a supporting surface by attaching the arms to a pair of slotted uprights.

BACKGROUND OF THE INVENTION

Field of the invention

This invention relates to display racks and more particularly to a rack having a series of hooks arranged to individually display and support a plurality of bicycle tires or the like.

Description of the prior art

Bicycle tires, unlike automobile tires, are not inherently self-supporting when displayed in an upright position and resting on a lower supporting surface. Bicycle tires are often displayed in commercial establishments in an upright, packed together, position so that removal of a particular tire from a group of tires is a difficult operation. The reason is that the weight of the neighboring tires produces a lateral force on the selected tire thereby restricting withdrawal of the selected tire. After a particular tire has been withdrawn, the remaining tires are often in a state of disarray and present a disorderly display.

In summary the prior art problem with displaying a plurality of bicycle tires is the lack of a suitable rack for attractively displaying a plurality of tires while at the same time permitting an individual tire to be readily separated from the remaining tires.

The preferred embodiment of the present invention, which will be subsequently described in greater detail, obviates the aforementioned problems by providing a display rack having means for individually suspending a group of tires in a manner permitting the separation of a selected tire without disturbing the remaining tires and which at the same time employes a minimum amount of space.

The preferred embodiment of the present invention comprises a pair of spaced apart upright members joined at their upper ends by a horizontal support member to form a self-supporting frame. A series of rigid wire tire hanging hooks are connected at a regular spacing to the horizontal support member. Each of the hooks has a shank portion swingably connected to the horizontal support member so that the downwardly depending hook portion is movable towards and away from its neighboring hook members. Each hook is engageable with the inner rim of a bicycle tire. Thus a plurality of tires can be attractively hung in a close side by side relationship thereby utilizing a minimum of space. A selected tire can be separated from the remaining tires by raising the selected tire sufficiently so that its associated hook can be swung sidewise permitting the selected tire to be removed from between its neighboring tires without disturbing the neighboring tires.

An alternate embodiment of the present invention contemplates a horizontal support member carrying a series of swingably mounted tire supporting hooks and having a pair of short arm members with means for engaging a pair of slotted uprights. This form of the invention is intended to be employed with the tubular, upright, slotted supporting members widely used in commercial outlets for mounting display units of various types.

It is therefore an object of the present invention to provide a rack for displaying and supporting a plurality of narrow annular objects such as bicycle tires or the like by providing a frame having a horizontal member supporting a series of tire supporting hooks, each of the hooks swingably connected to the arm for movement toward and away from its neighboring hook so that the tires can be individually mounted or removed from the rack without disturbing the remaining tires.

It is another object of the present invention to provide a means for displaying a plurality of bicycle tires at a selected height above a supporting surface by providing a support member having a series of tire supporting elements arranged in a generally horizontal direction, a self-supporting frame member and means for engaging the support member to the frame at a selected height above the supporting surface.

It is another object of the present invention to provide an improved means for suspending a bicycle tire by its inner rim for display purposes by providing a hook shaped member formed from a substantially U-shaped rigid wire section having upper ends laterally directed along a common axis for engaging a pair of apertures in a supporting member, shank sections depending downwardly from the inwardly directed portions and merging into a pair of spaced apart hook-shaped portions having their free ends connected by a lateral connecting portion.

Still further objects and advantages of the present invention will readily occur to one skilled in the art to which the invention pertains upon reference to the following detailed description.

Description of the drawings

The description refers to the accompanying drawing in which like reference characters refer to like parts throughout the several views and in which:

FIG. 1 is a perspective view of a rack for displaying tires and illustrating a preferred embodiment of the present invention;

FIG. 2 is a side elevational view of one of the tire supporting elements illustrated in the rack of FIG. 1;

FIG. 3 is a view taken along lines 3—3 of FIG. 2;

FIG. 4 is a view of a rack illustrating an alternative embodiment of the present invention for mounting the tires at a selected height above a supporting surface to a pair of slotted uprights; and FIG. 5 is a sectional view taken along lines 5—5 of FIG. 4.

Description of the preferred embodiment

Now referring to the drawings, FIG. 1 illustrates a preferred tire rack 10 as comprising an elongated, preferably tubular, U-shaped section having a horizontal supporting section 12 and spaced apart downwardly depending parallel legs 14. An elongated, preferably tubular foot section 16 is attached to the lower end of each of the legs 14 so that the feet 16, the legs 14, and the horizontal supporting section 12 provide an upright, self-supporting framework.

The horizontal supporting section 12 has a sufficient length to accommodate a series of regularly spaced tire supporting elements 18. Each tire supporting element 18 provides support means individually engageable with the inner circumference of a bicycle tire generally indicated at 20.

Referring to FIGS. 2 and 3, each tire supporting element 18 is preferably formed of a single wire section bent to a generally U-shaped configuration with its ends directed toward one another to form short ear portion 21 engaged by a pair of horizontally aligned apertures 22 formed in the opposite vertical side walls of the supporting section 12. The legs of the tire supporting element 18 depend downwardly from the ear portions 21 to form a pair of shank portions 24, a pair of short laterally bent portions 26 and upwardly bent end portions 28 connected by a short section 30. The bent portions 26 and the end portions 28 form a generally upwardly directed hook portion for engaging the inner rim of tire 20. Each tire supporting member 18 is swingable abut the ear portions 21 for sidewise movement toward and away from its neighboring tire supporting elements. Thus, preferably, the apertures 22 are formed in pairs on a series of spaced parallel axis. The tire supporting elements 18 are spaced apart a distance sufficient to permit an individual element 18 to be swung in a sidewise direction to permit a tire 20 to be inserted into or removed from between a pair of neighboring tires and the provision of the laterally bent sections 26 to permit the tire to be removed sidewise with a minimum of pivoting of the element 18 so that a maximum number of tires can be stored on the rack.

Now referring to FIGS. 4 and 5, a tire display rack 32 illustrates an alternate embodiment of the present invention. Rack 32 comprises a pair of spaced apart elongated tubular uprights 34 having lower end sections 36 outwardly bent in a common direction. A short leg section 38 forms a downward extension of each of the uprights 34. The uprights 34 are connected by a horizontal tubular brace member 40. Thus the uprights 34, the short legs 38 and the brace 40 form an upright self-supporting framework.

A pair of rows of regularly spaced slots 42 extend in a vertical direction in each of the uprights 34 and are formed on a common side of the uprights. Each pair of slots 42 in each upright 34 corresponds to a selected height above the surface supporting the rack 32 and has a corresponding pair of slots arranged at a similar height in the opposite leg 34.

A pair of outwardly directed arm members 44 extend in a generally horizontal direction from the uprights 34. Each arm 44 has a short downwardly bent inner end 46. Each of the portions at the inner ends 46 preferably carry an upper pair of hook members 48 (only one of which is shown) and a lower pair of members 50 (only one of which is shown). As can best be seen in FIG. 5, the upper pair of hooks 48 are spaced from the lower pair of hooks 50 a distance accommodating the vertical distance between a pair of slots 42. Thus the inner ends 46 can be lockingly engaged to the uprights 34 by inserting the hooks 48 and 50 in slots 42 corresponding to a selected vertical height.

A horizontal, elongated, preferably tubular support member 54 is carried at the outer ends of the arms 44. A series of tire supporting elements 56 are swingably connected to the support 54 at regularly spaced intervals throughout its length. The tire supporting elements 56 are similar to the tire supporting elements 18 of the embodiment illustrated in FIG. 1 and perform a like function by providing means for individually engaging the inner rim of a bicycle tire which are suspended in an attractive manner and permitting the removal of a selected bicycle tire without disturbing the remaining tires.

Although I have described but two embodiments of my invention, it is to be understood that various revisions and changes can be made therein without departing from the spirit of the invention as expressed in the scope of the appended claims.

I claim:
1. A rack for displaying tires or the like, comprising:
   (a) means providing a generally horizontal, elongated, support member having a pair of spaced parallel vertical side walls, said side walls having a series of pairs of apertures, each aperture of each pair arranged on a common horizontal axis; and
   (b) a plurality of unitary tire supporting elements, each of said tire supporting elements having a hook element and a shank portion, said shank portion being provided with a pair of ear portions, each of said ear portions being received by an aperture so that each of said tire supporting elements is swingably supported to said side walls for movement about its associated axis for movement toward and away from its neighboring elements, and said hook portions depending downwardly from said side portions, each of said hook portions providing a support for an individual tire.

2. The rack as defiened in claim 1 wherein each of said tire supporting elements comprise:
   (a) a substantially rigid wire section having a pair of spaced parallel side sections, the upper end of each of said side sections having an inwardly directed ear portion received by one of said apertures in said means;
   (b) a shank portion depending downwardly from said ear portions and merging into hook-shaped sections; and
   (c) a lateral section connecting the free ends of said hook-shaped sections so that a selected tire supporting element can be individually swung about its ear portions to a sidewise position permitting a tire to be placed in a raised supported position.

3. A rack as defined in claim 1, wherein said means include an upright, self-supporting frame, said self-supporting frame having a pair of upwardly directed elongated members integrally connected to opposite ends of said horizontal supporting member.

4. A rack as defined in claim 1, wherein said means include an upright self-supporting frame, and a pair of arm members extending from said frame, said arms having an inner end attached to said self-supporting frame and outer ends fixed to said horizontal supporting member, so that the suspended tires are displayed above a supporting surface.

5. A rack as defined in claim 4, including means for adjusting said tire supporting elements at a selected height above said supporting surface.

6. A rack as defined in claim 5, wherein said height adjusting means comprises said self-supporting frame having a pair of upwardly directed spaced apart parallel supporting members, a series of perforations regularly spaced in a vertical direction in a common side of each of said upwardly directed supporting members, each of said perforations on one of said upwardly directed supporting members formed at a common height with a corresponding perforation on the opposite of said upwardly directed supporting members; a clip section depending from the inner end of each of said arms, said clip sections having jaw portions engageable with a selected pair of perforations to lock said arms to said upwardly directed supporting members.

7. In combination with an elongated, horizontal support member having spaced apart side walls, said side walls having a series of pairs of apertures, and each of said pairs of apertures having a common axis, an article support element comprising:
   (a) a substantially rigid wire section having a pair of spaced parallel shank sections, the upper end of each shank section having an inwardly directed ear portion pivotally received by one of said apertures;

(b) a pair of substantially lateral parallel sections extending from said shank sections and merging into upwardly directed portions, to define a generally upwardly directed hook portion; and (c) a section connecting the free ends of said upwardly directed hook portions.

8. The combination as defined in claim 7 wherein each of said sections extending from said shank sections is formed at an angle obtuse to its respective shank section.

9. A rack as defined in claim 2, wherein said hook-shaped sections have a concave portion and the concave portion of each of said hook-shaped sections supportably engage the inner rim of a tire.

10. A rack for storing or displaying articles in a side by side relationship, comprising (a) means for providing a generally horizontal, elongated support member having a pair of spaced parallel vertical side walls, said side walls having a series of pairs of apertures, each aperture of each pair arranged on a common horizontal axis; and (b) a plurality of unitary article supporting elements, each of said article supporting elements having a hook element and a shank section, said shank section being provided with a pair of ear portions, each of said ear portions being received by an aperture so that each of said tire supporting elements is swingably supported to said side walls for movement about its associated axis for movement toward and away from its neighboring elements, and said hook portions depending downwardly from said side portions, each of said hook portions providing a support for an individual article.

11. A rack for displaying articles in a side by side relationship said rack comprising (a) means providing a generally horizontal, elongated support member;

(b) a plurality of hook elements and means swingably suspending said hook elements from said support member in a horizontally spaced array for swinging movement toward one another about axes in a generally horizontal plane and perpendicular to the longitudinal axis of said support member; and (c) each of said hook elements comprising a substantially straight shank section extending subtantially vertically from said support member when said hook elements are in the normal, suspended position, a substantially straight intermediate portion extending from said shank section at an obtuse angle and a substantially straight hook portion extending angularly upwardly from said intermediate portion.

References Cited

UNITED STATES PATENTS

| 687,250 | 11/1901 | Monfort | 108—30 |
| 1,450,084 | 3/1923 | Hull | 211—23 X |
| 2,246,081 | 6/1941 | Van Nattan | 211—124 X |
| 2,949,510 | 8/1960 | Sichel | 248—303 |
| 3,322,288 | 5/1967 | Mayer | 248—243 X |

FOREIGN PATENTS 1,182,869  6/1959  France.

CHANCELLOR E. HARRIS, *Primary Examiner.*

U.S. Cl. X.R.

211—123; 248—341